Patented Aug. 30, 1949

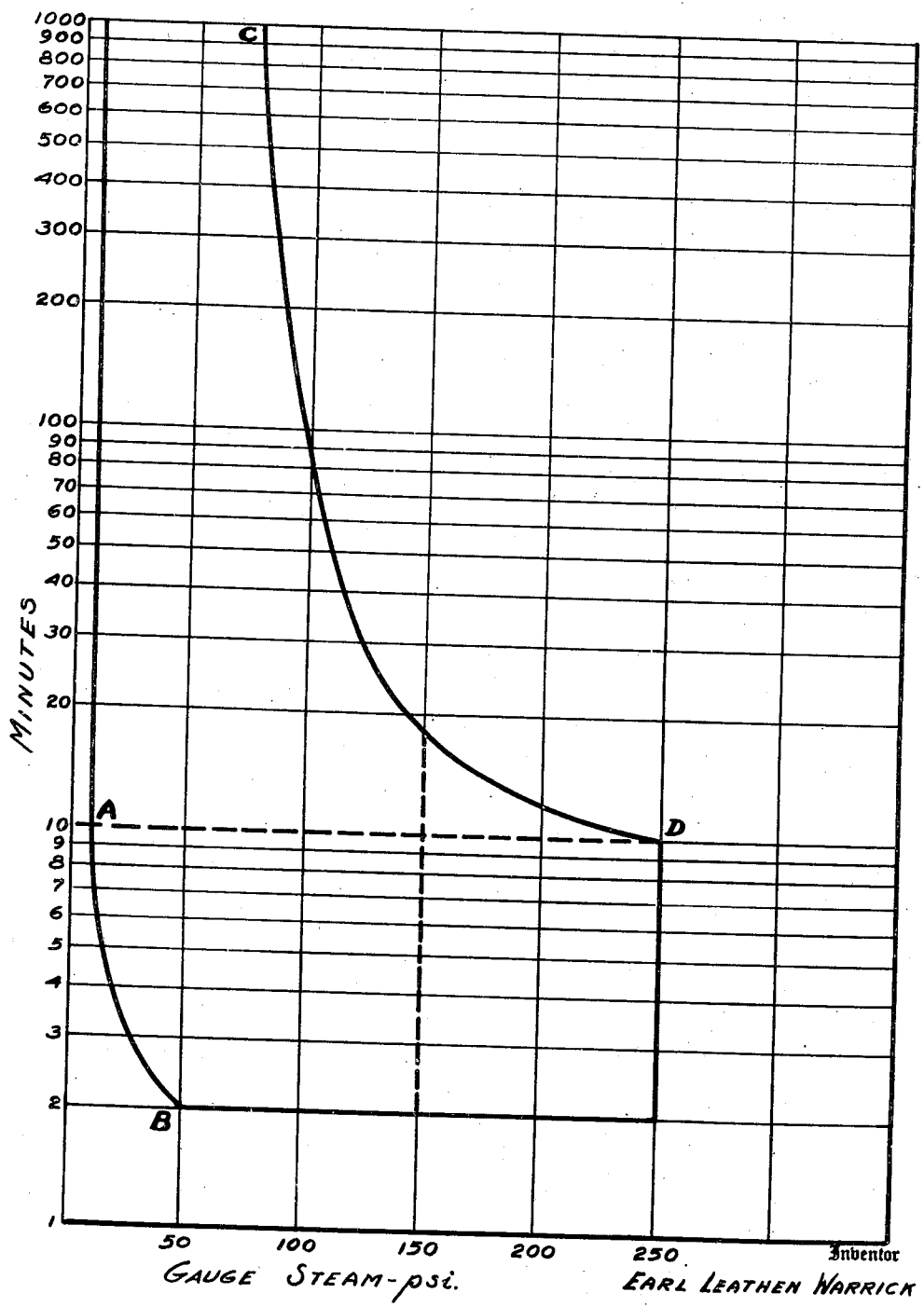

2,480,620

UNITED STATES PATENT OFFICE 2,480,620

ORGANOSILOXANE ELASTOMERS

Earl Leathen Warrick, Pittsburgh, Pa., assignor to Corning Glass Works, Corning, N. Y., a corporation of New York Application December 27, 1946, Serial No. 718,857

6 Claims. (Cl. 260—46.5)

1

The present invention relates to the fabrication of elastomers of the organosiloxane type and particularly to methods for use in the vulcanization thereof.

The organosiloxanes are polymers constituted of polymer units of the type $R_nSiO_{4-n}$, wherein R is a monovalent organic radical bonded to the silicon by a carbon-silicon linkage. The organo polysiloxanes are of diverse physical form and utility. Their physical form and resultant utility is dependent to a large extent upon the value of the integer $n$ in the siloxane units contained in the polymer and the relative distribution of these types of units. The physical characteristics are likewise, but generally to a more limited extent, dependent upon the specific organic radicals represented by "R." By variation of these factors, products are obtained which are low molecular weight compounds and have determinable melting and boiling points, which are of high average molecular weight and are thermosetting or thermoplastic resinous compositions and which are of molecular weight varying from low to high and are stable fluids.

In my copending patent applications Ser. Nos. 557,055 and 557,056, both filed October 3, 1944; Ser. No. 607,101, filed March 1, 1946; Ser. Nos. 651,382 and 651,383, both filed March 1, 1946; and Ser. No. 655,245, filed March 18, 1946, it is shown that elastomeric products are obtainable in the organosilicon class of materials. Application, Serial No. 557,056, has now become Patent No. 2,460,795. These products are prepared by the vulcanization of organo polysiloxanes which have an average degree of substitution between 1.75 and 2.25 and which contain at least 40 mol per cent of diorganosiloxane units of the type RR'SiO in which R represents alkyl and R' represents alkyl or aryl. The alkyl radicals preferably contain less than 8 carbon atoms per radical. These organosiloxanes from which the elastomers are produced may vary in degree of condensation from relatively low molecular weight materials through and including high molecular weight materials.

Vulcanization of these organosiloxanes is effected by heating the organosiloxane with an appropriate vulcanizing agent. Preferred vulcanizing agents are the diorgano peroxides in which at least one of the organic radicals is an aromatic acyl. This group of vulcanizing agents includes alkyl aromatic-acyl peroxides, such as tertiarybutyl perbenzoate, and the diacyl peroxides, such as benzoyl peroxide and acetyl benzoyl peroxide. A wide range of peroxides of the

2 defined class have been employed for vulcanization of the organo-siloxanes and all have been found effective. Vulcanizing agents of this type are employed in amount between 1 and 10% based on the amount of siloxane present. Other suitable vulcanizing agents include diacetyl peroxide, triphenylstibine, dimethyl mercury, tributyltin acetate, tetraethyllead, tetraphenylbismuth, lead tetraacetate, mercury acetate, $CrO_3$, $CrO_3+CuO$, and $CO_2O_3+CuO$.

The specific physical properties of the elastomers produced depend upon the specific organopolysiloxane employed, its degree of polymerization and upon the specific vulcanizing agent and filler which are used. While elastomers are obtainable by vulcanizing low molecular weight siloxanes, improved physical properties are obtained by employing siloxanes which contain long unbranched chain structures whether the siloxane is in the form of a soluble liquid or an insoluble, tacky, rubbery solid.

Suitable fillers include asbestos, clay, silica aerogel, fiber glass, iron oxides, bentonite, alumina, zinc oxide, magnesia, lead oxide, titania, carbon black and other similar materials. Organic fillers, such as cellulose, may be employed if desired, since it has been found that the organic fillers are stabilized by the siloxane.

To effect vulcanization, the masticated and compounded organosiloxane, which includes the siloxane, the vulcanizing agent, and if desired any filler and mold release agent, is heated at a temperature above 100° C. It is preferred in order to obtain the most rapid curing that the temperature at which the composition is heated be also above the decomposition temperature of the peroxide in those cases in which a peroxide is employed for vulcanization.

One of the common characteristics of the indicated materials is that during vulcanization, bubbles form within the material which cause the product to the spongy. This characteristic can be overcome readily by vulcanizing the compounded silioxanes in pressure molds.

Objects of the present invention are to provide improved methods for handling compounded siloxanes during vulcanization; and to provide methods for vulcanizing compounded siloxanes which prevent the vulcanized product from being spongy while avoiding the use of pressure molds during vulcanization.

In accordance with a preferred form of the present invention, the compounded organosiloxane is vulcanized under controlled conditions in contact with saturated steam. The vulcanized elastomer is then cured in an oven to improve the physical properties thereof.

The accompanying drawing shows the correlation of time and pressure employed in the vulcanization in accordance with the present invention. Steam pressure in pounds per square inch gauge is graphed horizontally on a linear scale against time in minutes graphed vertically on a three-cycle log scale.

In the first step of the process hereof, the compounded organosiloxane is vulcanized in direct contact with saturated steam at a gauge pressure of between 10 and 250 pounds per square inch for a time correlated with the pressure to lie above the line AB and below the line CD in the accompanying drawing. When operating at a gauge pressure of between 10 and 50 pounds per square inch, if a time is employed, which, correlated with the pressure, would lie below the line AB, the vulcanization obtained is insufficient to prevent the formation of bubbles in the material during subsequent curing. When operating at a gauge pressure of between 75 and 250 pounds per square inch, if a time is employed which correlated with pressure would lie above the line CD, a weak product is produced upon curing, probably due to depolymerization as a result of the introduction of hydroxyl radicals. Pressures less than 10 p. s. i. are insufficient to prevent foaming during vulcanization. Pressures above 250 p. s. i. should not be employed inasmuch as foaming of the organosiloxane polymer results despite the high pressure. Preferred operating pressures are between 10 and 150 p. s. i. For economic reasons it is preferred that the vulcanization in the presence of saturated steam be conducted for a period of not over 1000 minutes and preferably for a period of less than 10 minutes but for at least 2 minutes. In order for this first step to be entirely effective in preventing formation of bubbles in the material, the period from the time of exposure of the material to a temperature of 80° C. to the time the pressure is up to 10 p. s. i. should be less than two minutes.

A preferred manner of operation involves the gradual reduction of the steam pressure at the end of the vulcanizing step. This gradual reduction may be effected by slow release of the steam or by stepwise reduction of the steam pressure. This gradual reduction allows the gases within the vulcanized material a better opportunity to diffuse out of the material.

During the vulcanization in contact with saturated steam, the steam serves three fundamental purposes; first, it supplies heat for the vulcanization. Second, it excludes air from the elastomer, which at this stage is detrimental. Third, it prevents the elastomer from becoming spongy.

The minimum steam pressure of 10 p. s. i. gauge provides a temperature of 116° C. which is in excess of the minimum temperature for vulcanization.

In the second step of the process hereof, the vulcanized siloxane is cured at substantially atmospheric pressure at a temperature above that employed in the first step. The atmosphere in contact with the siloxane during curing is not particularly critical under the conditions stated due to the general inertness of the vulcanized siloxane. The siloxane is held at the elevated temperature for at least an hour in this second or curing step. During this curing the desirable properties of the siloxane develop and vary. In general, there is obtained an increase in the tensile strength, a decrease in elongation, and an increase in hardness. These properties change progressively as the curing progresses under the described conditions. Curing conditions should therefore be selected to give the combination of properties desired. Curing for more than 48 hours or at a temperature higher than 300° C. generally is undesirable.

In order to obtain vulcanization without bubbling in the first step hereof, it is necessary that the compounded siloxane be in direct contact with the saturated steam in some portion of its superficial surface, though it is unnecessary that all or substantially all of the surface be in contact therewith. Thus, the process hereof may be employed to fabricate sheets of siloxane elastomer by vulcanizing the compounded siloxane in a steam autoclave with the entire surface of the sheet in direct contact with the steam.

Alternatively, if it is desired to produce a sheet with two smooth-finish surfaces, the compounded siloxane can be placed between two plates and the plates placed in the steam autoclave, whereby the steam is in direct contact with the compounded siloxane at the edges of the sheet, and thereby prevents volumetric expansion of the elastomer. The vulcanization of extruded forms, such as tubing, made of these elastomers presents a very serious problem inasmuch as the vulcanization thereof in a press is impracticable commercially. This invention is particularly applicable to the vulcanization of forms of this character and produces particularly beneficial results.

The process hereof may be conducted in a continuous manner in the fabrication of such items as rubber covered wire. A coating of the compounded siloxane is extruded upon the surface of the wire, and the covered wire is drawn through a continuous steam vulcanizer and then through a curing oven. In such an operation it is preferred to employ a steam vulcanizer with a steam lock intermediate its length, whereby the covered wire is first exposed to steam under a pressure of between 10 and 250 p. s. i. and then to steam at a lower pressure after passing through the steam lock.

The following example illustrates the application of the present invention to the fabrication of commercial products.

A compounded siloxane was employed which was prepared by milling 100 parts of titania, 4 parts of benzoyl peroxide and 100 parts of a polymer produced by polymerizing a mixture of low molecular weight cyclic dimethyl siloxanes with potassium hydroxide in the proportion of one potassium per 500 silicons, the polymer being an insoluble solid of the nature of unvulcanized natural gum rubber. This compounded siloxane was extruded in the cross-sectional shape desired for a gasket. The extrusions were dusted with talc, and placed in a tray. A steam autoclave was brought up to temperature, and all condensate was blown out of the lines. The pressure was dropped sufficiently to open the autoclave. The extrusions were placed in the autoclave, immediately. The autoclave was closed and the pressure immediately brought up. The time from placing the extrusions in the hot autoclave to pressuring of the autoclave was less than one minute. The pressure was maintained at 20 p. s. i. for five minutes. The exhaust ports of the autoclave were opened and the vulcanized extrusions then removed and placed in an air oven. The oven was held at 175° F. for two hours, at 230° F. for one hour and at 390° F. for four hours.

I claim:

1. The method of producing organosilicon elastomers which comprises vulcanizing an extrudable compounded siloxane composed of a filler, benzoyl peroxide, and a readily deformable dimethyl polysiloxane by heating the mixture in direct contact with saturated steam at a gauge pressure between 10 and 250 pounds per square inch for a period between 2 and 1000 minutes, said period being correlated with steam pressure to lie above the line AB and below the line CD in the accompanying drawing, and thereafter curing the vulcanized elastomer at a temperature higher than the steam temperature during vulcanizing for at least one hour.

2. The method of producing organosiloxane elastomers which comprises vulcanizing an extrudable compounded siloxane which is composed of a readily deformable organopolysiloxane which has a degree of substitution between 1.75 and 2.25 monovalent hydrocarbon radicals per silicon atom and which contains at least 40 mol percent of siloxane units of the type RR'SiO in which R represents alkyl and R' represents a monovalent hydrocarbon radical free of aliphatic unsaturation, a filler and a vulcanizing agent, by heating said compounded siloxane in direct contact with saturated steam at a gauge pressure between 10 and 250 pounds per square inch for a period between 2 and 1000 minutes, said period being correlated with steam pressure to lie above the line AB and below the line CD in the accompanying drawing and thereafter curing the vulcanized elastomer at substantially atmospheric pressure at a temperature higher than the steam temperature during vulcanization for at least one hour.

3. The method defined in claim 2 in which the period from exposure of the siloxane to a temperature above 80° C. to the time the steam gauge pressure is up to at least 10 pounds per square inch is less than 2 minutes.

4. The method defined in claim 2 in which the steam pressure is gradually reduced.

5. The method defined in claim 2 in which the initial temperature in the curing step is below the temperature maintained during vulcanization, and the final temperature is higher than that maintained during vulcanization.

6. The method in accordance with claim 2 wherein the vulcanizing agent is a diorganoperoxide in which at least one organic radical is an aromatic acyl radical.

EARL LEATHEN WARRICK.

REFERENCES CITED

The following references are of record in the file of this patent:

UNITED STATES PATENTS

| Number | Name | Date |
|---|---|---|
| 2,445,794 | Marsden | July 27, 1948 |
| 2,448,565 | Wright | Sept. 7, 1948 |

OTHER REFERENCES

The Vanderbilt Rubber Handbook, pp. 31, 266, 267, 8th edition, 1942.

Servais, Rubber Age, vol. 58, No. 5, February 1946, pp. 579 to 584.

Ellis, The Chemistry of Synthetic Resins, vol. 1, page 286, Reinhold, 1935.